United States Patent Office ──

2,856,298
Patented Oct. 14, 1958

2,856,298
EMULSION CLEANER COMPOSITION

Paul C. Watson, North Quincy, Mass., assignor, by mesne assignments, to E. I du Pont de Nemours & Company, Wilmington, Del., a corporation of Delaware No Drawing. Application August 5, 1957
Serial No. 676,421

17 Claims. (Cl. 106—11)

This invention relates to cleaning compositions and combination cleaning-polishing compositions, and more particularly to improved aqueous emulsion compositions formulated primarily for cleaning and conditioning weathered automobile finishes for subsequent waxing.

Numerous cleaners, polishes and waxes have been offered to satisfy an automobile owner's desire to attractively maintain the finish of his automobile and to protect it against weathering. Cleaning and polishing of the finish involves considerable manual labor and consequently one is ever searching for cleaning and polishing means which require a minimum of effort to obtain the desired results and which provide maximum service between repeated operations.

Typical cleaners, polishes, pre-waxing compounds and combination products formulated for use on automobile finishes are described in Milton A. Lesser's "Modern Chemical Specialties," (1950) Mac Nair-Dorland Company, N. Y. Chapter XX and in H. Bennett's "The Chemical Formulary" volume IX (1951) The Chemical Publishing Co., Inc. Numerous of these classes of products are proprietary formulations embraced by patents of which U. S. Patents 2,154,721, 2,250,667 and 2,523,281 are representative.

Although these prior art products provide satisfactory results, they leave much to be desired in reference to performance and speed of cleaning and polishing. Automobile finishes have been significantly improved during the last several decades by improvements in both the organic film-forming vehicle and the pigments dispersed therein. Consequently, the finishes exhibit a lower rate of deterioration and chalking on exposure to the weather. Although a lower rate of deterioration presupposes less frequent cleaning and polishing, increased deposition of traffic film and industrial smog on the finish necessitates an increased frequency of cleaning and polishing. The basic need for conditioning the finish in industrial areas has shifted from removal of chalk and other residues of deterioration resulting from weathering to removal of traffic film and airborne industrial deposits. Deposits and films of this nature are not removable by ordinary washing operations.

An important object of this invention is to provide certain improvements in cleaning and polishing compositions which enhance the performance and reduce the manual effort required to obtain this superior performance. Another important object is to provide cleaning and polishing compositions for automobile finishes characterized by ease of removal of products of surface deterioration caused by weathering, traffic film and other air-borne, difficultly removable deposits precipitated from the atmosphere onto the finish. Still another object is to provide a method of preparing these improved cleaning and polishing compositions.

These important objects are accomplished by incorporating an effective small proportion of at least one soluble chelating agent in a cleaning and polishing composition comprising an oil phase comprising a non-volatile neutral polishing oil, an aqueous phase comprising water, a water-soluble gum and at least one water-soluble polyhydric alkanol having humectant properties and a finely divided mild abrasive. The chelating agent is preferably characterized by the general formula

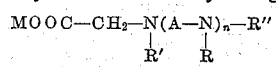

where M is a member of the group consisting of hydrogen, alkali metal, ammonium, and 1 to 4 carbon atom alkyl-ammonium; R—, R'— and R" are each separately members of the group consisting of —CH$_2$CH$_2$OH, —CH$_2$—COOM and —CH$_2$—CH$_2$—COOM and may be the same, —A— is an alkylene radical selected from the group consisting of

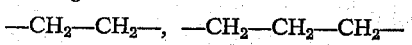

and

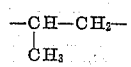

and $n$ is an integer in the range 0, 1, 2, 3, 4.

Automobile cleaners and combination cleaner/polish compositions on the market are predominantly emulsion compositions of the type having a dispersed oil phase in a continuous aqueous phase. Basically these compositions comprise a mild abrasive, a non-volatile neutral polishing oil dispersed in an aqueous phase comprising water and a small proportion of a water-soluble gum, such as "Keltex" refined algin, or gum tragacanth, which functions both as an emulsifier to stabilize the dispersion and as a bodying agent to maintain the abrasive in suspension, and a water-soluble aliphatic polyhydric alcohol, such as glycerine, as a humectant to prevent premature drying and dusting of the applied abrasive cleaner before the abrasive has served its purpose.

I have found that the performance of these basic formulations of emulsion cleaner compositions is improved when from .2% to about 4.%, preferably about .5% to about 1.5%, of a soluble chelating agent, particularly of the aforementioned general formula, is added to the composition.

The following tabulation is illustrative of the invention compositions showing operative and preferred proportions for the essential components and certain desirable supplementary components.

TABLE 1

|  | General Range, Percent by Wt. | Preferred Range, Percent by Wt. |
|---|---|---|
| Essential Components: |  |  |
| (a) Non-Volatile, Water-Immiscible Neutral Polishing Oil | 2–12 | 3–9 |
| (b) Abrasive | 5–25 | 10–20 |
| (c) Soluble Chelating Agent | .2–4.0 | .5–1.5 |
| (d) Water-Soluble Gum | .1–1 | .2–.6 |
| (e) Water-Soluble Aliphatic Polyhydric Alcohol, Humectant | 3–12 | 5–10 |
| (f) Water | 25–90 | 40–65 |
| Supplementary Components: |  |  |
| (g) Volatile Aliphatic Petroleum Hydrocarbon Diluent for Polishing Oil | 0–12 | 5–10 |
| (h) Water-Soluble Monohydric Aliphatic Alcohol | 0–15 | 5–12 |
| (i) Preservative for Gum | 0–1 | .2–.5 |
| (j) Emulsifier | 0–1 | .05–.5 |
| (k) Acidic Neutralizer | 0–.5 | .1–.3 |

The basic formulation essentially comprises components (a), (b), (c), (d), (e) and (f). Although the combination of the indicated basic components provides a product which is advantageously improved over corresponding formulations in which the chelating agent (c) is omitted and over commercially available cleaning and polishing products for conditioning automobile finishes, still further improvements result when the optional supplementary components, particularly components (g) and (h) are added to the basic formulation. The optional, but desirable, supplementary components (i), (j) and (k) are not pertinent to the cleaning and polishing performance of the product, but they enhance the package stability.

Component (a), the polishing oil, is a water-immiscible, non-volatile, neutral oil, preferably a low viscosity mineral oil or lubricating oil composed of aliphatic hydrocarbons. Oily liquid polysiloxanes can be used in place of or in combination with the mineral oil. Ordinary polishing waxes, such as beeswax and carnauba, can be dispersed in the oil phase as a supplementary component at a concentration up to 3% based on the total weight of the product. Although these waxes enhance the protective quality of the oil film remaining on the finish after the cleaning operation, waxes ordinarily are not included in the composition when it is primarily designed as a prepolishing or prewaxing cleaner. When the wax is present, the composition serves as a combination product which cleans and leaves a moderately protective oil/wax on the finish without a separate polishing operation following the cleaning operation.

The abrasive component (b) can be any of the mild siliceous abrasives ordinarily used in abrasive cleaning and polishing formulations designed for use on paints, lacquers, varnishes and enamels, particularly automobile finishes. Suitable abrasives include for example: diatomaceous earth, silica flour, amorphous silica, airfloated Tripoli, rottenstone and fuller's earth. Less abrasive and milder abrasive combinations than are ordinarily specified in cleaner formulations can be satisfactorily used in the invention products because the chelating agent present in the composition significantly improves the cleaning ease, particularly in reference to removal of chalk and other debris of deterioration of the finish by weathering. Because of the use of such milder siliceous abrasives in the invention formulations there is less opportunity of scratching the finish during the cleaning operation. Diatomaceous earth which functions both as a mild abrasive and as an absorbent is particularly preferred as the abrasive component. "Snow Floss" supplied by Johns-Manville Corporation and "Multicel" #000 supplied by Tamms Industries Inc. represent particularly useful commercially available grades of diatomaceous earth.

The proportions of the abrasive are not significantly critical. About 5% by weight of abrasive is a practical minimum and about 25% is a practical maximum. Although products containing a higher proportion of abrasive can be formulated, such products ordinarily require thinning with water to provide a desired working consistency.

Component (c), the soluble chelating agent, constitutes the key to the significant improvement in the performance of the invention products.

Particularly useful chelating agents are defined by the general formula

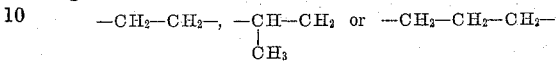

where M, A, R, R', R", and n are as identified above.

When n is 0, the general formula corresponds to a tertiary monoamine; that is a substituted amino acetic acid or salt thereof as defined by M. When R' and R" of this tertiary monoamine are each —CH$_2$—CH$_2$—OH, the chelating agent is N, N di-(beta hydroxyethyl) glycine or salts of this glycine where the salt forming substituent is defined by M.

When n is 1, the chelating agent is a substituted diamine having the two amino nitrogen atoms separated by the divalent alkylene radical —A—. When the substituents R, R' and R" are each —CH$_2$COOM and —A— is —CH$_2$—CH$_2$—, the resulting chelating agent corresponds to ethylenediaminetetraacetic acid and salts thereof as defined by M.

When n is 2, 3 or 4, the chelating agent is a substituted polyamine; that is, correspondingly a triamine, tetramine or pentamine respectively. The amino nitrogen atoms of these polyamines, and of the diamines are separated by a divalent alkylene radical —A— having a carbon chain length of 2 or 3 carbon atoms. A— can be —CH$_2$—CH$_2$—, —CH—CH$_2$ or —CH$_2$—CH$_2$—CH$_2$—
                |
                CH$_3$ Chelating agents having this polyamine structure have a plurality of R substituents and consequently a plurality of chelate-forming groups.

Chelating agents in which n is 0, 1, or 2 are preferred. Those in which n is 1 and mixtures of the defined chelating agents in which the major proportion is of the type in which n is 1 are particularly preferred. A mixture consisting of a major proportion of the tetrasodium salt of ethylenediaminetetraacetic acid and a minor proportion of the sodium salt of N-N di-(betahydroxethyl) glycine is a particularly preferred mixture of chelating agents.

The substituents R, R' and R" can be alike or different, and are selected from —CH$_2$—CH$_2$OH, —CH$_2$—COOM and —CH$_2$—CH$_2$—COOM. Representative chelating agents based on ethylenediamineacetic acid in which the R, R' and R" substituents are different include:

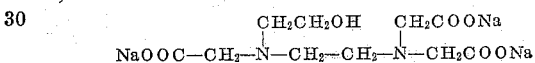

and

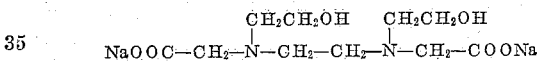

Similarly, R' and R" can be alike or different when R is absent as a result of n being 0. A representative product of this type in which R' and R" are unlike is

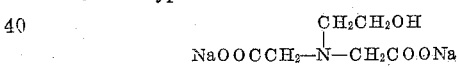

Na in the above chelating agents can be replaced by any of the other substituents defined by M.

Any of these monoamine, diamine or polyamine chelating agents defined by the indicated general formula can be satisfactorily used in amounts within the specified proportions indicated in Table 1.

The water-soluble gum, component (d), which in aqueous solution functions as a suspending agent for the abrasive can be used at any concentration which provides the product with a desired working consistency. Ordinarily the concentration of the gum can be from .1% to about 1%; preferably .2% to about .6% based on the weight of the product. When calculated on the basis of the water content, the desirable gum concentration is from about .4 part to about .8 part for each 100 parts of water. Useful water-soluble gums include for example refined algin, gum tragacanth, gum arabic, gum karaya, pectin, Indian gum, and ammonium alginate. "Keltex" water-soluble refined algin supplied by Kelco Gum Co. is particularly preferred.

Water-soluble methyl cellulose can supplement the water-soluble gum in an amount up to 1% based on the total weight of the emulsion product as a matting agent to facilitate removal of the abrasive and other debris from the surface being cleaned. Use of methyl cellulose for this purpose follows the teachings of U. S. Patent 2, 250,-667.

Component (e), the humectant, is a water-soluble polyhydric alkanol which functions to retard drying or powdering of the abrasive during the cleaning operation. Glycerine is a commonly used humectant. Ethylene glycol, 1,2-propylene glycol, other water-soluble alkanediols, and other water soluble alkanetriols can be substituted for the glycerine or used in combination with it as the humectant. A mixture of from .5 to 2 parts of ethylene glycol per part of glycerine is particularly preferred as the humectant. The presence of the ethylene glycol or 1,2-propylene glycol enhances the cleaning action of the composition.

The water content of the aqueous emulsion component ordinarily can be from about 25% to about 90%, preferably from about 40% to about 65%. The water content is so selected to provide the product with a desired working consistency. A fluid consistency of less than 10 poises is preferred to facilitate spreading the material. Compositions at pastelike consistency can be easily thinned with water for application to the finish.

Although the basic formulation consisting of components (a), (b), (c), (d), (e) and (f) exhibits advantageously improved performance in removal of chalk and other debris of film deterioration due to weathering, the formulation exhibits only a moderate improvement over ordinary commercially available cleaners and polishes in reference to removal of traffic film and other residues of air-borne industrial contamination which are deposited on the finish. Removal of these traffic and air-borne-industrial deposits which involves a somewhat different cleaning principle than is required in the removal of chalk and other residues resulting from weathering is significantly enhanced by the presence of certain volatile diluents in both the oil phase and the aqueous phase of the emulsion product.

Aliphatic petroleum hydrocarbons are useful volatile, water-immiscible diluents which are compatible with the polishing oil of the oil-phase. This diluent component (g), preferably should volatilize at a rate less than that of water and it is important that the solvency of this diluent in reference to the organic film-forming components of the finish is insignificant. Kerosine is a particularly preferred oil-phase diluent. Petroleum naphthas and mineral spirits can be used in its place or in combination with kerosine. Minor proportions of volatile aromatic hydrocarbons or high solvency petroleum naphthas can be present with the low solvency aliphatic petroleum hydrocarbons provided the resulting mixture is inert toward the finish.

Volatile, water-soluble aliphatic monohydric alcohols, preferably isopropanol, are useful diluents as component (h) for the aqueous phase. Propanol and tertiary butanol can be used in place of the isopropanol. Methanol and ethanol can be used in minor proportions, but they are less effective than isopropanol for removal of traffic film and there is hazard that significant aqueous concentrations of methanol and ethanol will adversely attack the finish.

The combination of component (g), the volatile aliphatic petroleum hydrocarbons of the oil-phase, the component (h), the volatile water-soluble monohydric alcohol of the aqueous phase, plus component (e), the water-soluble humectant, particularly humectant containing ethylene glycol, is significantly effective within the indicated preferred proportions for removal of traffic film and other industrial deposits which collect on the finish. The chelating agent also provides an advantageous contribution to this diluent combination for the effective removal of these deposits, but its contribution is more effective in reference to removal of chalk and surface residues of film deterioration due to weathering.

Aqueous solutions of water-soluble vegetable gum ordinarily are subject to bacterial decomposition and therefore it is desirable to include component (i), a preservative for the gum, in the composition. The preservative can be of either the water-soluble-type or oil-soluble-type. Formaldehyde which is representative of the water-soluble type is preferred. Orthophenyl phenol is representative of useful phenolic preservatives which can be incorporated in the oil phase.

At low concentrations of the water-soluble gum, the emulsified oil-phase ordinarily does not remain dispersed for a significantly long period of time and it is desirable to improve the stability of the emulsion by the presence of component (j), an emulsifier, to supplement the emulsifying activity of the gum. The emulsifier can be cationic, anionic or non-ionic. Soluble soaps of fatty acids, preformed or formed in situ, amine and morpholine salts of fatty acids, salts of long carbon chain primary amines, fatty monoesters of polyethylene glycols and alkylated aryl polyether alcohols are typical useful emulsifiers. The non-ionic emulsifiers are preferred and of these, the monooleate esters of polyoxyethylene sorbitan having an intermediate level of hydrophile/lipophile balance, such as "Tween" 81 supplied by Atlas Powder Co. are particularly preferred.

Presence of the optional component (k), the acidic neutralizer, is desirable to maintain the pH of the product in the range of about 6 to 8.5. Phosphoric acid and chromic acid or its anhydride are preferred acidic components. Chromic acid is particularly preferred because it provides more effective anti-corrosion protection for packaging the aqueous emulsion product in ordinary containers fabricated from tin-plated sheet steel. Although other mineral acids such as sulfuric acid and hydrochloric acid can be used for neutralization, they do not provide adequate anti-corrosion protection for packaging the product in metal containers. Phosphoric acid and chromic acid are also useful for increasing the water-solubility of the chelating agent which in some instances is not readily soluble in water.

Minor proportions of compatible dyes or colored pigment matter also can be optionally present in the product for purposes of color marking or for propriety identification. Odorants can also be included to mask the odor of the volatile diluents.

The following specific examples are illustrative of the invention.

*Example 1*

| | Percent by weight |
|---|---|
| Aqueous algin solution—1% | 22.0 |
| Aqueous solution of tetra sodium salt of ethylene diamine tetraacetic acid—32% | 12.0 |
| Water | 35.9 |
| Glycerine | 5.0 |
| Kerosine | 8.0 |
| Neutral mineral oil | 3.5 |
| Emulsifier—"Tween"—81 | 0.1 |
| Abrasive-diatomaceous earth—"Multicel" #000 | 13.5 |
| | 100.0 |

The aqueous algin solution was prepared by dissolving "Keltex" refined algin at a concentration of from 1.5% to 2% in water at about 95° C. and thinning the resulting solution with cold water to 1% concentration.

The other ingredients were added to the gum solution in the indicated order with continuous mixing, forming a dispersion of the kerosine and non-volatile oil in the resulting aqueous phase, and finally the abrasive was dispersed in the resulting emulsion. The product was mixed 30 minutes after the addition of the abrasive to provide a uniform oil-in-water emulsion.

A corresponding composition in which the solution of the chelating agent, sodium salt of ethylene diaminetetraacetic acid, was replaced with water was used as a reference control product.

Samples of the product of Example 1 and of the control were applied by a cheesecloth pad to weathered panels of representative automotive finishes which had been exposed in Florida atmosphere to chalk and deteriorate. Cheesecloth pads saturated the respective compositions were weighted with a 500 gram weight which was in the form of a cylinder having a diameter of 1.5 inches. The weathered finish was conditioned by 10 passes with the weighted pad wet with cleaner followed by 20 passes of a cheesecloth pad similarly weighted after the residual cleaner on the finish had dried.

The respective conditioned areas of the weathered finish were compared and the area cleaned with the product of Example 1 was significantly more free of chalk and surface residues of film deterioration than the area cleaned with the control composition.

Further tests showed that fewer cleaning strokes or passes were required with the product of Example 1 in comparison with the control composition to remove the chalk from the finish. In some instances the relative number of passes were reduced to one half and ordinarily only about .75 times as many passes were required to provide chalk removal equivalent to that of the control.

An automobile hood which had a coating of traffic film and other air-borne industrial deposits on the finish as a result of exposure in an industrial atmosphere without significant weathering deterioration was comparatively conditioned in the same manner with the control and the product of Example 1. The results indicated an advantageous difference in the effectiveness for this type of cleaning favoring the product of Example 1.

*Example 2*

| | Percent by weight |
|---|---|
| Aqueous align solution—1% | 22.0 |
| Aqueous solution of chelating agent—10% | 10.0 |
| Glycerine | 5.0 |
| Isopropanol—95% | 10.0 |
| Water | 27.9 |
| Kerosine | 8.0 |
| Neutral mineral oil | 3.5 |
| Emulsifier "Tween" 81 | .1 |
| Abrasive-diatomaceous earth—"Multicer" #000 | 13.5 |
| | 100.0 |

The solution of align was the same as that used in Example 1.

The solution of chelating agent consisted of 9 parts of the tetra sodium salt of ethylenediamine tetraacetic acid, 1 part of the sodium salt of N,-N-di(betahydroxyethyl) glycine, orthophosphoric acid in sufficient amount to neutralize the solution to a pH of 7.2 and sufficient water for the solution to total 100 parts by weight.

The product of Example 2 was prepared in the same manner as described for Example 1.

The resulting emulsion product was comparatively evaluated with the product of Example 1 and the described control composition. The product of Example 2 was moderately more effective than the product of Example 1 and significantly more effective than the control for ease of removal of chalk and other deterioration residues due to weathering of automobile finishes. These finishes were represented by nitrocellulose lacquer automotive enamels, metallic lacquer automotive enamels containing dispersed aluminum flake pigment, drying oil modified alkyd resin automotive enamels, metallic drying oil modified alkyd resin automotive enamels, acrylic resin automotive enamels and automotive enamels formulated with a combination of a non-drying oil modified alkyd resin and an amino-aldehyde resin.

When comparatively evaluated for removal of traffic film and other air-borne industrial deposits on the finishes which showed no significant deterioration due to weathering, the performance of the product of Example 2 was significantly better than that of the product of Example 1 and the control. This product of Example 2 having the combination of kerosine, isopropanol, glycerine and chelating agent was more effective for removal of traffic film than corresponding products in which either the isopropanol was omitted or the chelating agent and the isopropanol were omitted.

*Example 3*

| | Percent by weight |
|---|---|
| Aqueous solution of chromic anhydride—1% | 20.0 |
| Chelating agent | 1.0 |
| Water | 9.0 |
| Aqueous solution of algin—1% | 22.0 |
| Ethylene glycol | 4.4 |
| Glycerol | 4.0 |
| Isopropanol—95% | 10.0 |
| Kerosine | 8.0 |
| Neutral mineral oil | 4.0 |
| Emulsifier—"Tween" 81 | .1 |
| Preservative-aqueous formaldehyde—37% | .5 |
| Abrasive-diatomaceous earth—"Snow-Floss" | 17.0 |
| | 100.0 |

The chelating agent was the same as used in Example 2; that is, a mixture of the tetra sodium salt of ethylenediaminetetraacetic acid and the sodium salt of N,N-di-(betahydroxyethyl) glycine. A particularly useful mixture of these two chelating agents is the commercially available "Versene" Fe-3 supplied by Dow Chemical Co.

The aqueous solution of algin, "Keltex," was the same as specified in Examples 1 and 2.

The product of Example 3 was prepared by combining the components in the indicated order with continuous agitation sufficient to disperse the water-immiscible components in the aqueous medium. The resulting emulsion was mixed for about 30 minutes after the addition of the abrasive.

The viscosity of the emulsion was about 2.5 poises at 25° C.

The performance of this product in reference to removal of chalk and other residues of film deterioration due to weathering was equal to that of the product of Example 2. The performance in reference to removal of traffic film and other air-borne industrial deposits was better than that of the product of Example 2 and superior to that of the control product and the product of Example 1.

In practical field tests, samples of the product of Example 3 and well known commercially available prewaxing emulsion cleaner compositions were blindly evaluated by employees of service stations and garages as well as by individual motorists on the finishes of various makes of automobiles. The invention product was consistently picked as exhibiting the best performance.

Further advantages of the product of Example 3 are that it can be stored for long periods of time without deterioration and can be safely packaged in ordinary containers fabricated from tinplated sheet steel without hazard of early can corrosion.

While there are disclosed above but a limited number of embodiments of the products and processes of the invention, it is possible to produce still other embodiments without departing from the inventive concept herein disclosed, and it is desired therefore that only such limitations be imposed on the appended claims as are stated therein or are required by the prior art.

I claim:

1. An oil in water emulsion composition designed for cleaning and conditioning weathered organic automobile finishes, consisting essentially of a water-immiscible oil-phase consisting essentially of about 2–12% of a nonvolatile neutral polishing oil, an aqueous phase consisting essentially of at least 25% of water, about .1–1% of a water-soluble gum of vegetable origin, and about 3–12% of a water-soluble polyhydric alkanol as a humectant; at least 5% of a mild abrasive, and from .2% to 4%, of at least one soluble aliphatic tertiary amine chelating agent having the general formula

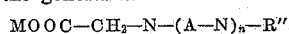

where the substituent M— is a member of the group consisting of hydrogen, alkali metal, ammonium and 1 to 4 carbon alkyl ammonium; the substituents R—, R'— and R"— are each separately members of the group consisting of —CH$_2$—CH$_2$OH, —CH$_2$—COOM and

—CH$_2$—CH$_2$COOM and may be the same, —A— is a divalent alkylene radical selected from the group consisting of —CH$_2$—CH$_2$—, —CH$_2$—CH$_2$—CH$_2$— and $$-\underset{\underset{CH_3}{|}}{CH}-CH_2-$$

and $n$ is an integer in the range 0, 1, 2, 3, 4, said percentages being based on the total weight of the composition.

2. The composition of claim 1 in which said chelating agent is present in an amount from about .5% to about 1.5% by weight.

3. The composition of claim 1 in which said chelating agent is a di-tertiary amine represented by $n$ being 1.

4. The composition of claim 1 in which said chelating agent is a salt of ethylene-diamine tetraacetic acid having said substituent M as sodium.

5. The composition of claim 1 in which said chelating agent consists of a mixture of the tetra sodium salt of ethylenediamine tetraacetic acid and the sodium salt of N,N,-di-(betahydroxyethyl) glycine.

6. The composition of claim 1 in which said oil-phase further includes as a diluent for said polishing oil up to 12% of a volatile aliphatic petroleum hydrocarbon.

7. The composition of claim 6 in which said volatile hydrocarbon is kerosine.

8. The composition of claim 1 in which said aqueous phase further includes up to 15% of a volatile, water-soluble monohydric aliphatic alcohol.

9. The composition of claim 8 in which said monohydric alcohol is isopropanol.

10. An oil-in-water emulsion composition, designed for cleaning and conditioning weathered organic automobile finishes, having a formula defined by the following proportions:

Essential components:                            Percent by wt.
(a) Non-volatile, water-immiscible neutral
    polishing oil _____ 2–12
(b) Finely-divided mild siliceous abrasive ___ 5–25
(c) Soluble aliphatic tertiary amine chelat-
    ing agent _____ .2–4
(d) Water soluble gum of vegetable origin __ .1–1
(e) Humectant-water-soluble polyhydric al-
    kanol _____ 3–12
(f) Water _____ 25–90
Supplementary components:
(g) Volatile aliphatic petroleum hydrocarbon
    diluent _____ 0–12
(h) Volatile water-soluble monohydric ali-
    phatic alcohol _____ 0–15
(i) Bactericidal mold-inhibiting preservative
    for said soluble gum _____ 0–1
(j) Emulsifier capable of dispersing oil in
    water _____ 0–1
(k) Mineral acid neutralizer for adjustment
    to about 6 to 8.5 pH _____ 0–.5 said chelating agent having the general formula $$MOOC-CH_2N-(A-N)_n-R''$$
$$\phantom{MOOC-CH_2N}|\phantom{(A-N)_n-}|$$
$$\phantom{MOOC-CH_2N}R'\phantom{(A-N)_n}R$$

where the substituent M— is a member of the group consisting of hydrogen, alkali metal, ammonium and 1 to 4 carbon alkyl ammonium; the substituents R—, R'— and R"— are each separately members of the group consisting of —CH$_2$—CH$_2$OH, —CH$_2$—COOM and

—CH$_2$—CH$_2$COOM and may be the same; —A— is a divalent alkylene radical selected from the group consisting of —CH$_2$—CH$_2$—, —CH$_2$—CH$_2$—CH$_2$— and $$-\underset{\underset{CH_3}{|}}{CH}-CH_2-$$

and $n$ is an integer in the range 0, 1, 2, 3, 4.

11. An oil-in-water emulsion composition, designed for cleaning and conditioning weathered organic automobile finishes, having a formula defined by the following proportions:

|  | Percent by wt. |
|---|---|
| (a) Neutral mineral oil | 3–9 |
| (b) Mild siliceous abrasive | 10–20 |
| (c) Soluble aliphatic tertiary amine chelating agent | .5–1.5 |
| (d) Water-soluble algin | .2–.6 |
| (e) Humectant-mixture of ethylene glycol and glycerol | 5–10 |
| (f) Water | 40–65 |
| (g) Kerosine | 5–10 |
| (h) Isopropanol | 5–12 |
| (i) Preservative-formaldehyde | .2–.5 |
| (j) Emulsifier-non-ionic capable of dispersing oil in water | .05–.5 |
| (k) Acidic neutralizer-chromic acid | .1–.3 | said chelating agent having the general formula $$MOOC-CH_2-N(A-N)_n-R''$$
$$\phantom{MOOC-CH_2-N}|\phantom{(A-N)_n-}|$$
$$\phantom{MOOC-CH_2-N}R'\phantom{(A-N)_n}R$$

where the substituent M— is a member of the group consisting of hydrogen, alkali metal, ammonium and 1 to 4 carbon alkyl ammonium; the substituents R—, R'— and R"— are each separately members of the group consisting of —CH$_2$—CH$_2$OH, —CH$_2$—COOM and

—CH$_2$—CH$_2$COOM and may be the same; —A— is a divalent alkylene radical selected from the group consisting of

—CH$_2$—CH$_2$—, —CH$_2$—CH$_2$—CH$_2$— and $$-\underset{\underset{CH_2}{|}}{CH}-CH_2-$$

and $n$ is an integer in the range 0, 1, 2, 3, 4.

12. An oil-in-water emulsion composition, designed for cleaning and conditioning weathered organic automobile finishes, having substantially the following proportions of components:

|  | Percent by wt. |
|---|---|
| (a) Neutral mineral oil | 4.00 |
| (b) Diatomaceous earth | 17.00 |
| (c) Soluble aliphatic tertiary amine chelating agent | 1.00 |
| (d) Water-soluble algin "Keltex" | .22 |
| (e) Humectant { glycerol | 4.00 |
| { Ethylene glycol | 4.40 |
| (f) Water | 50.58 |
| (g) Kerosine | 8.00 |
| (h) Isopropanol | 10.00 |
| (i) Preservative-aqueous formaldehyde 37% | .50 |
| (j) Emulsifier-mono oleate ester of polyoxyethylene sorbitan | .10 |
| (k) Chromic anhydride | .20 |
|  | 100.00 | said soluble chelating agent consisting of a mixture of about 90% by weight of the tetrasodium salt of ethylenediaminetetraacetic acid and 10% of the sodium salt of N,N-di-(beta-hydroxyethyl) glycine.

13. The process of preparing an oil-in-water emulsion composition, designed for cleaning and conditioning weathered organic automobile finishes, which comprises forming a fluid solution of about .1–1% of a water-soluble vegetable gum in water, adding thereto about 3–12% of a water-soluble polyhydric alkanol having humectant properties, about 2–12% of a water-immiscible, non-volatile neutral oil and about .2–4% of a soluble aliphatic tertiary amine chelating agent, forming an oil in water emulsion of said oil as the dispersed liquid phase in the resulting aqueous phase and dispersing at least 5% of a mild abrasive in the resulting emulsion having a water content of at least 25%, said percentages being based on the total weight of the composition.

14. The process of preparing an oil-in-water emulsion composition, designed for cleaning and conditioning weathered organic automobile finishes, which comprises forming a fluid solution of from .2% to .6% of a water-soluble vegetable gum in water, adding thereto from .5% to 1.5% of a soluble aliphatic tertiary amine chelating agent, from 5% to 12% of a water-soluble, volatile, aliphatic monohydric alcohol, from 5% to 10% of at least one water-soluble polyhydric alkanol having humectant properties, and from 5% to 10% of a volatile aliphatic petroleum hydrocarbon, adding from 3% to 9% of a water-immiscible, non-volatile neutral polishing oil, forming an oil in water emulsion of said volatile hydrocarbon and said non-volatile oil as the dispersed liquid phase in the resulting aqueous phase, and dispersing from 10% to 20% of a mild siliceous abrasive in the resulting emulsion, said percentages being based on the total weight of the composition, water representing the balance of the composition in an amount from about 40–65%.

15. The process of claim 14 in which said monohydric alcohol is isopropanol, said humectant is a mixture of approximately equal weight proportions of ethylene glycol and glycerol, said volatile hydrocarbon is kerosine, said polishing oil is mineral oil, said vegetable gum is algin, and said mild siliceous abrasive is diatomaceous earth.

16. The process of claim 14 wherein said emulsification step consists of dispersing said volatile hydrocarbon and said polishing oil in said aqueous phase in the presence of about .05 to 1% of an emulsifier capable of dispersing oil in water and the process further includes adjusting the composition to a pH of 6 to 8.5 with chromic acid in an amount up to .5%.

17. In a liquid oil in water emulsion composition, designed for cleaning and conditioning weathered organic automobile finishes, essentially comprising about 2–12% of a non-volatile, water-immiscible neutral polishing oil, a finely-divided mild siliceous abrasive and a solution in water of about .1–1% of a water-soluble gum of vegetable origin, the combination of enhancing modifiers therefor consisting essentially of about .2–4% of a soluble aliphatic tertiary amine chelating agent, about 3–12% of a mixture of .5 to 2 parts of ethylene glycol per part by weight of glycerine, about 5–12% of a volatile aliphatic petroleum hydrocarbon characterized by a rate of volatilization less than that of water, and about 5–15% of isopropanol, said percentages being based on the total weight of said emulsion composition.

References Cited in the file of this patent

UNITED STATES PATENTS

| 2,154,721 | Blount et al. | Apr. 18, 1939 |
| 2,250,667 | Hall | July 29, 1941 |
| 2,542,385 | Ayo et al. | Feb. 20, 1951 |

OTHER REFERENCES

Sequestrene, Geigy Industrial Chemicals, New York, 1952 (page 27).